(12) United States Patent
Imura et al.

(10) Patent No.: US 8,056,660 B2
(45) Date of Patent: Nov. 15, 2011

(54) VEHICLE, GENERATOR CONTROL APPARATUS IN VEHICLE, AND VEHICLE DRIVE UNIT

(75) Inventors: Shinya Imura, Toride (JP); Norikazu Matsuzaki, Mito (JP); Masaru Ito, Hitachinaka (JP); Shin Fujiwara, Naka (JP); Tatsuyuki Yamamoto, Mito (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 11/638,435

(22) Filed: Dec. 14, 2006

(65) Prior Publication Data

US 2007/0137910 A1 Jun. 21, 2007

(30) Foreign Application Priority Data

Dec. 19, 2005 (JP) ................................ 2005-364196

(51) Int. Cl.
*B60K 6/00* (2007.10)
(52) U.S. Cl. .................... 180/65.24; 180/65.31
(58) Field of Classification Search .................. 180/65.1, 180/65.21, 65.285, 65.31
See application file for complete search history.

(56) References Cited

U.S. PATENT DOCUMENTS

| | | | | |
|---|---|---|---|---|
| 3,489,914 A * | 1/1970 | Taylor | | 307/59 |
| 6,548,990 B2 * | 4/2003 | Okuno et al. | | 322/36 |
| 6,558,290 B2 * | 5/2003 | Phillips et al. | | 477/5 |
| 6,581,705 B2 * | 6/2003 | Phillips et al. | | 180/65.25 |
| 7,098,628 B2 * | 8/2006 | Maehara et al. | | 322/24 |
| 7,268,442 B2 * | 9/2007 | Syed et al. | | 290/40 C |
| 7,395,888 B2 * | 7/2008 | Yamamoto et al. | | 180/65.29 |
| 2003/0204294 A1 | 10/2003 | Gluch | | |
| 2005/0140342 A1 | 6/2005 | Maehara et al. | | |
| 2006/0022469 A1 * | 2/2006 | Syed et al. | | 290/40 C |

FOREIGN PATENT DOCUMENTS

| | | |
|---|---|---|
| EP | 1 306 257 A2 | 5/2003 |
| EP | 1 524 144 A2 | 4/2005 |
| JP | 02311200 A * | 12/1990 |
| JP | 2002-235576 A | 8/2002 |
| JP | 2004-210452 A | 7/2004 |

OTHER PUBLICATIONS

European Search Report dated Apr. 16, 2010 (Six (6) pages).

* cited by examiner

*Primary Examiner* — J. Allen Shriver, II
*Assistant Examiner* — Bridget Avery
(74) *Attorney, Agent, or Firm* — Crowell & Moring LLP

(57) ABSTRACT

A vehicle can ensure an engine torque the driver desires even though the load torque of a generator with respect to the engine varies, and in particular can restrain occurrence of such a risk that an engine stall occurs when a load to the engine is large upon, for example, engagement of a clutch. A controller predicts a load torque of the generator with respect to the engine in future several hundred milliseconds at maximum from the present time, in view of a magnetic field voltage and a speed of the generator at the present time, and controls the engine in accordance with the predicted load torque in order to prevent the output torque of the engine from being insufficient.

1 Claim, 5 Drawing Sheets

VEHICLE, GENERATOR CONTROL APPARATUS IN VEHICLE, AND VEHICLE DRIVE UNIT

FIELD OF THE INVENTION

The present invention relates to a vehicle incorporating an engine and a generator driven by the engine, a generator control apparatus in a vehicle, and a vehicle drive unit, and in particular to a control method for an engine and a generator upon variation in load torque of a generator.

RELATED ART

For example, JP-A-2002-235576 discloses a method of controlling an engine and a generator driven by the engine in a certain type wherein the output power of the engine is increased or the load torque of the generator is restrained if a torque deviation obtained by subtracting a minimum allowable torque with which the engine dose not come to a stop, from an output torque of the engine, is greater than a load torque of the generator with respect to the engine.

However, in such a method, as disclosed in JP-A-2002-235576, that the output power of an engine is increased in accordance with a load torque of a generator at present, a certain time lapses until the engine actually increases its output torque up to a target value, and accordingly, the output torque of the engine would possibly become insufficient for a while, resulting in possible occurrence of an engine stall. Further, in a method in which the load torque of the generator is restrained, a power generation capacity which is generally required cannot be ensured. Thus, it had better to prevent the use of this method if possible.

SUMMARY OF THE INVENTION

An object of the present invention is to provide such a configuration that the output torque of an engine is prevented from being insufficient while a required power generation capacity is ensured as far as possible.

To the end, according to the present invention, there is provided a vehicle comprising an internal combustion engine and a generator driven by the internal combustion engine, wherein a load torque of the generator is predicted with respect to the internal combustion engine, and the internal combustion engine is driven under control in accordance with the predicted load torque.

Further, in order to achieve the above-mentioned object, according to the present invention, there is provided a vehicle incorporating an internal combustion engine comprising a plurality of drive mechanisms, a generator driven by the internal combustion engine, an engine control unit for controlling operation of the plurality of drive mechanisms, and a generator control unit for controlling power generation of the generator, wherein the generator control unit delivers a signal relating to a load torque of the generator with respect to the internal combustion engine, to the engine control unit, the engine control unit receives the signal delivered from the generator control unit, and delivers signals to the drive mechanisms which are therefore operated, and if the load torque varies in response to a variation in output power of the generator, a peak value of wave height of a waveform exhibiting variation in operation of the drive mechanisms, with respect to a time base, occurs earlier than a peak value of wave height of a waveform exhibiting variation in the load torque transmitted from the generator to the internal combustion engine, with respect to a time base.

Further, in order to achieve the above-mentioned object, there is provided a generator control unit for controlling power generation of a generator driven by an internal combustion engine, wherein a load torque of the generator is predicted with respect to the internal combustion engine, a signal based upon the predicted load toque, is delivered to a means for controlling the drive of the internal combustion engine in order to control the drive of the internal combustion engine in accordance with the predicted load torque.

Further, in order to achieve the above-mentioned object, according to the present invention, there is provided a generator control unit for controlling the output power of a generator driven by an internal combustion engine, wherein the generator control unit receives a demand value required for controlling the output power of the generator, and a plurality of root-means square values of the generator which are required for controlling the output power of the generator, as input signals, and delivers an instruction value required for controlling the output power of the generator, as an output signal to the generator, and further, the control unit also delivers a signal relating to a load torque of the generator with respect to the internal combustion engine, as an output signal to a means for controlling the drive of the internal combustion engine, earlier than the above-mentioned signal of the instruction value required for controlling the output power of the generator.

Further, in order to achieve the above-mentioned object, according to the present invention, there is provided a vehicle drive apparatus incorporated in a four-wheel vehicle having an internal combustion engine for driving either front wheels or rear wheels, the other being driven under motor power, comprising an electric motor for producing the motor power, a generator driven by the internal combustion engine, for generating a drive electric power for the electric motor, and a controller for controlling the drive of the electric motor and the generator, wherein the controller predicts a load torque of the generator with respect to the internal combustion engine, and delivers a signal based upon the predicted load torque, for controlling the drive of the internal combustion engine in accordance with the predicted load torque, to a means for controlling the drive of the internal combustion engine, in order to control the drive of the internal combustion engine in accordance with the predicted load torque.

In order to achieve the above-mentioned object, there is provided a vehicle drive apparatus incorporated in a four-wheel vehicle having an internal combustion engine for driving either front wheels or rear wheels, the other being driven under motor power, comprising an electric motor for producing the motor power, a generator driven by the internal combustion engine, for generating a drive electric power for the electric motor, a controller for controlling the drive of the electric motor and the generator, wherein the controller receives, as input signals, a drive demand value from the vehicle, and a plurality of root-mean-square values of the generator and the electric motor, which are required for controlling the output power of the generator, and delivers a magnetic field instruction value required for controlling the output power of the generator, as a as an output signal to the generator, and a signal relating to a load torque of the generator with respect to the internal combustion engine, as an output signal to a means for controlling the drive of the internal combustion engine, earlier than the signal of the magnetic field instruction value.

In view of the above-configurations of the present invention in which a load torque of the generator is predicted with respect to the engine, and the engine is controlled in accordance with the predicted load torque, thereby it is possible to prevent the output torque of the engine from being insufficient while a required electric power generation capacity can be ensured as far as possible.

Explanation will be hereinbelow detailed in the form of preferred embodiment of the present invention with reference to the accompanying drawings which are:

Other objects, features and advantages of the invention will become apparent from the following description of the embodiments of the invention taken in conjunction with the accompanying drawings.

BRIEF DESCRIPTION OF SEVERAL VIEWS OF DRAWING

Figure 7:
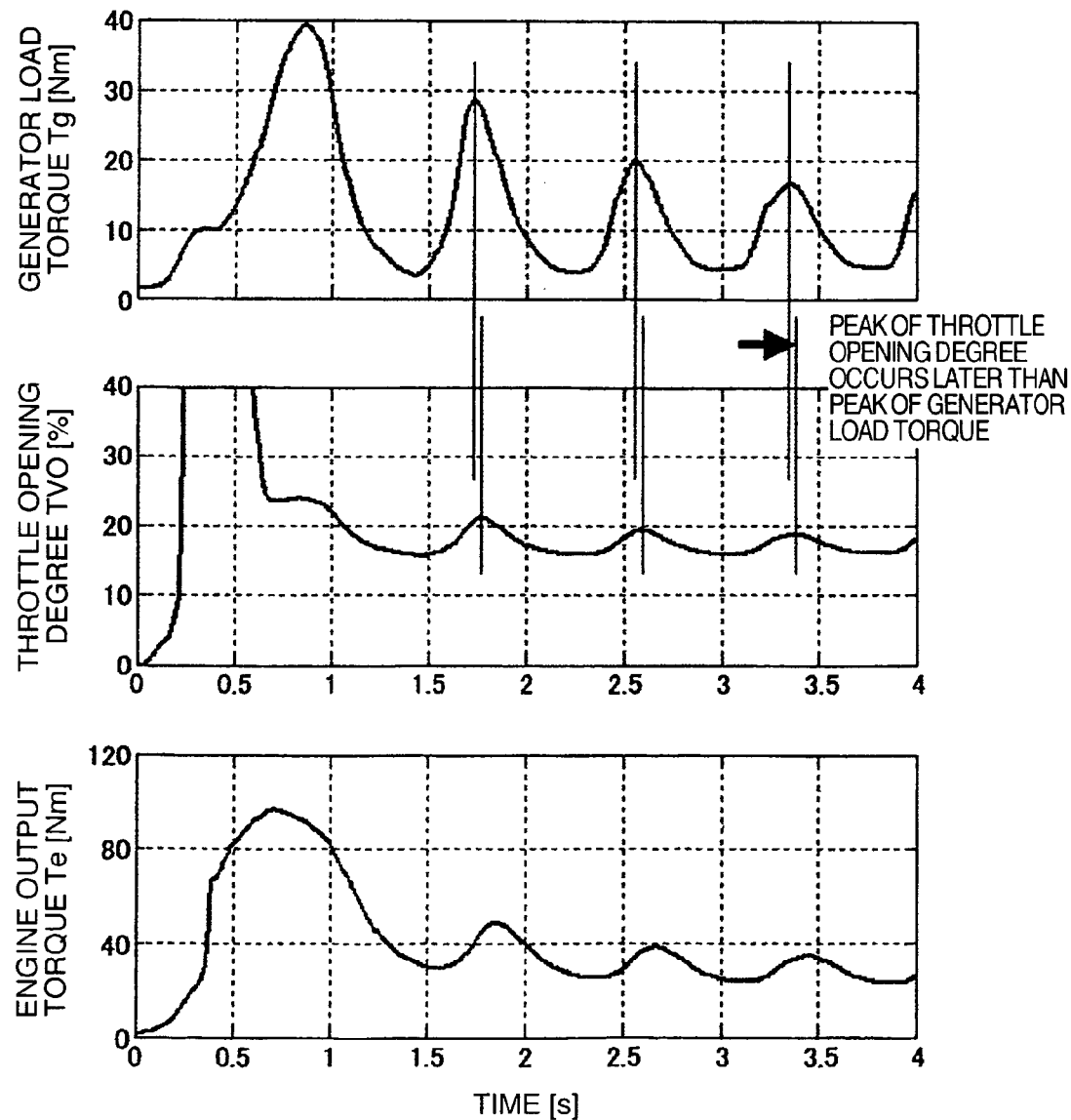
Figure 8:
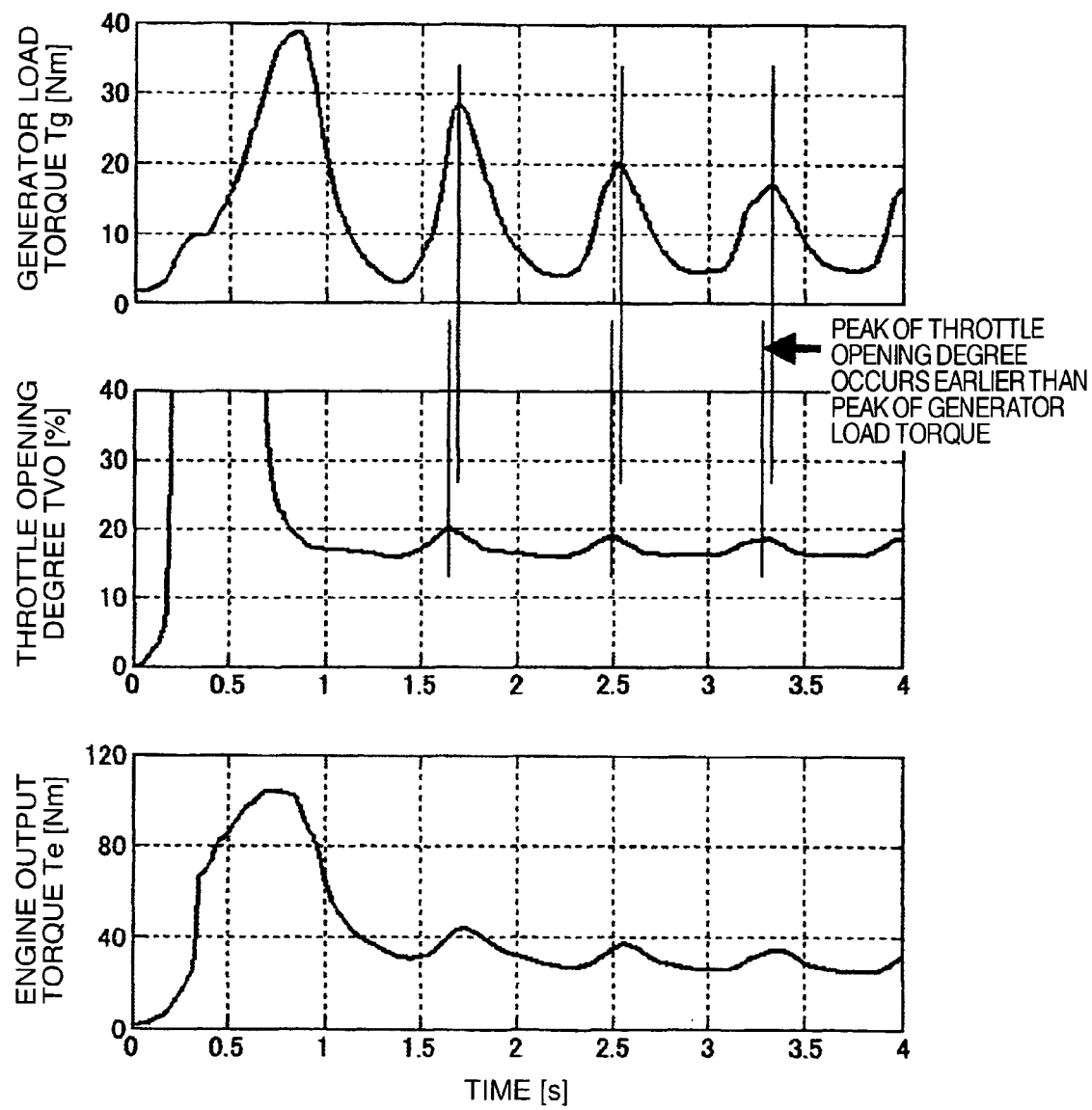

FIG. 7 is a view for explaining, as an example, such a case that a throttle opening degree is changed in accordance with a present value of load torque of the generator with no application of the present invention; and FIG. 8 is a view for explaining, as an example, such a case that a throttle opening degree is changed in accordance with a predicted value of load torque of a generator with the application of the present invention.

DESCRIPTION OF PREFERRED EMBODIMENTS OF THE INVENTION

Figure 1:
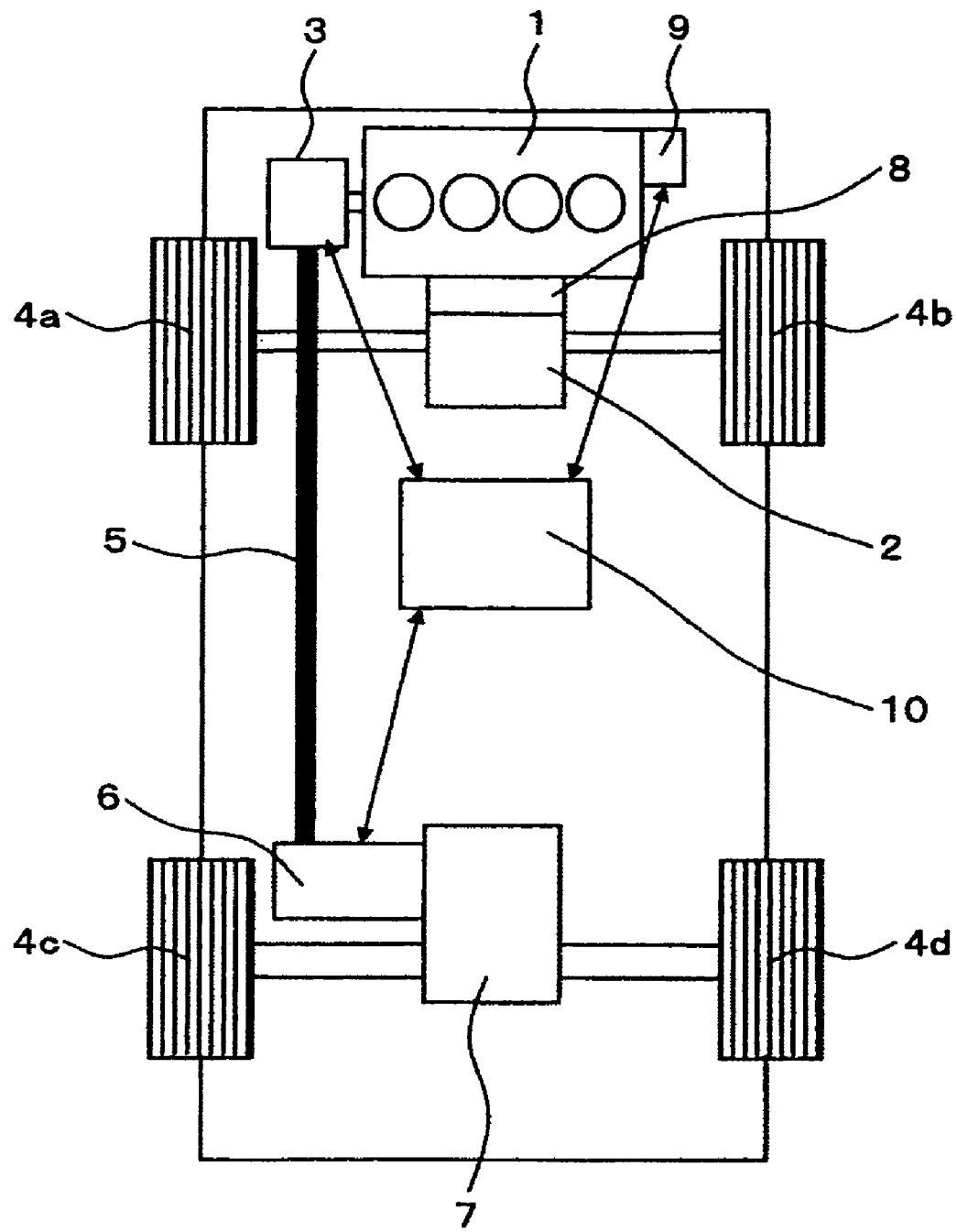
FIG. 1 is a view illustrating, as an example, a configuration of a vehicle in which the present invention is applied.

Referring to FIG. 1 which shows, as an example, a configuration of a vehicle in which the present invention is applied, there is shown a hybrid four wheel drive vehicle incorporating a manual transmission although the present invention may be applied to any of vehicles incorporating a generator, irrespective of a kind of a transmission, other than the hybrid vehicle.

A power generated by an engine 1 is transmitted to a transmission 2 and a generator 3. The power transmitted to the transmission 2 is distributed to left and right front wheels 4a, 4b. The generator 3 generates an electric power with the use of the power transmitted from the engine 1, and feeds the electric power to a motor 6 by way of a power feeder 5. The motor 6 utilizes the electric power fed from the generator 3 so as to produce a power which is transmitted to a differential gear 7 for distributing the power into left and right rear wheels 4c, 4d.

A clutch 8 is provided between the engine 1 and the transmission 2, for cutting off or limiting power transfer between the engine 1 and the transmission 2 in response to operation of a clutch pedal (which is not shown) by a driver. During a start of the vehicle, when the driver gradually returns the clutch pedal from a depressed position, the value of transferred power between the engine 1 and the transmission 2 is gradually increased from the cut-off condition until the completion of engagement of the clutch.

The engine 1 incorporates an electronic control throttle 9 which can change the throttle opening degree, independent from the operation of an accelerator pedal (which is not shown) by the driver.

A controller 10 which carries out computation, controls the generator 3, the motor 6 and the electronic control throttle 9.

The engine 1 produces a torque (which will be hereinbelow referred to as "engine output torque") in accordance with an engine rotational speed and a throttle opening degree. Thus, the output torque of the engine 1 can be changed when the throttle valve opening degree is changed. Several hundred milliseconds elapse at maximum until the output torque of the engine is changed after the throttle valve opening degree is changed. The speed of the engine 1 is accelerated of decelerated by a torque which is obtained by subtracting an input shaft toque of the transmission 2 by way of the clutch 8, a load torque of the generator 3 with respect to the engine 1, and the like from the above-mentioned engine output torque.

The generator 3 produces an output power in accordance with a speed of the generator, a magnetic field current or a load of the generator and the like, and also produces a load torque (which will be referred to as "generator load torque") with respect to the engine 1. By changing the magnetic field voltage of the generator, the magnetic field current of the generator can be changed, thereby it is possible to change the output electric power, and accordingly, the generator load torque can be also changed. Several hundred milliseconds elapse at maximum until the output power of the generator and the generator load torque are changed after the magnetic field voltage of the generator is changed.

The motor 6 generates a torque in accordance with a speed and a magnetic field current of the motor and a power fed from the generator 3. Further, through the rotation of the motor 6, a motor induced voltage is produced, resulting in an electric load to the generator 3. It is noted that an electric resistance of the power feeder 5 also applies a load to the generator 3.

Figure 2:
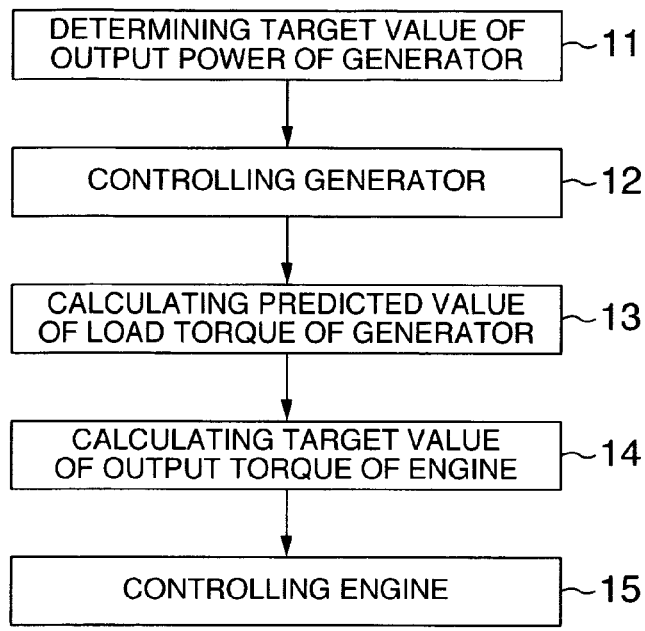
FIG. 2 is a view for explaining, as an example, a control method according to the present invention, which is applied to the vehicle shown in FIG. 1.

FIG. 2 shows, as one example, a control method according to the present invention, applied to the vehicle having the configuration shown in FIG. 1.

Figure 3:
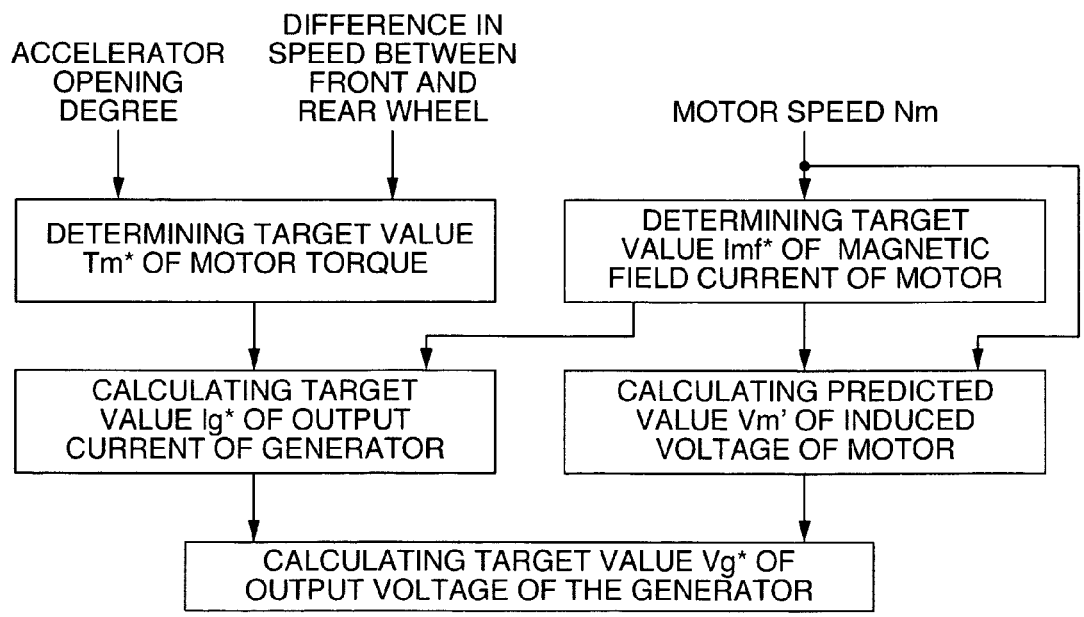
FIG. 3 is a view for explaining, as an example, a specific process at step 11 shown in FIG. 2.

At step 11, a target value $Vg^*$ or $Ig^*$ of voltage or current produced from the generator 3 is determined. An example of a process at this step is shown in FIG. 3. At first, a target value $Tm^*$ of torque of the motor is determined from an accelerator opening degree TVO, a difference in speed between the front and rear wheels and the like. Since a motor torque Tm is determined from an output current Ig of the generator 3 and a magnetic field current Imf of the motor, the target value $Ig^*$ of output current of the generator can be calculated from the target value $Tm^*$ of torque of the motor and a magnetic field voltage Vmf of the motor or a target value $Imf^*$ of magnetic field current of the motor. The magnetic field voltage Vmf or the target value $Imf^*$ of magnetic field current of the motor are determined from a speed Nm of the motor and the like. The target value $Vg^*$ of output voltage of the generator can be calculated from the target value $Ig^*$ of output current of the generator and a predicted value Vm' of induced voltage of the motor. The predicted value Vm' of induced voltage of the motor can be calculated from the speed Nm of the motor and the magnetic field voltage Vmf of the motor or the target value $Imf^*$ of magnetic field current of the motor.

Further, the target value $Vg^*$ of output voltage of the generator and the target value $Ig^*$ of output current of the generator may be determined in reference to a table which has been prepared by setting thereon accelerator opening degree, difference in speed between the front and rear wheels, speed Nm of the motor and the like.

Further, a signal Nm' in which the phase of the speed Nm of the motor is advanced with the use of a phase-lead filter or the like, may be used in the above-mentioned calculations, instead of the speed Nm of the motor.

At step 12, the magnetic field voltage Vgf of the generator 3 is changed so as to set the power output of the generator to a value equal to the target value set at step 11. The magnetic field voltage Vgf of the generator may be changed also through feed-back control by sensing the output current Ig of the generator in order to set the output current Ig of the generator to a value equal to the target value Ig* of output current of the generator, or by sensing the output voltage Vg of the generator in order to set the output voltage Vg of the generator to a value equal to the target value Vg* of output voltage of the generator. Further, since the output voltage Vg of the generator is determined from the speed Ng of the generator and the magnetic field current Igf of the generator, the target value Igf* of magnetic field current of the generator is calculated from the target value Vg* of output voltage and the speed Ng of the generator, and then, the magnetic field voltage Vgf of the generator may be changed so as to set the magnetic field current Igf of the generator to a value equal to the target value Ig*. Further, the above-mentioned processes may be used in combination.

Figure 4:
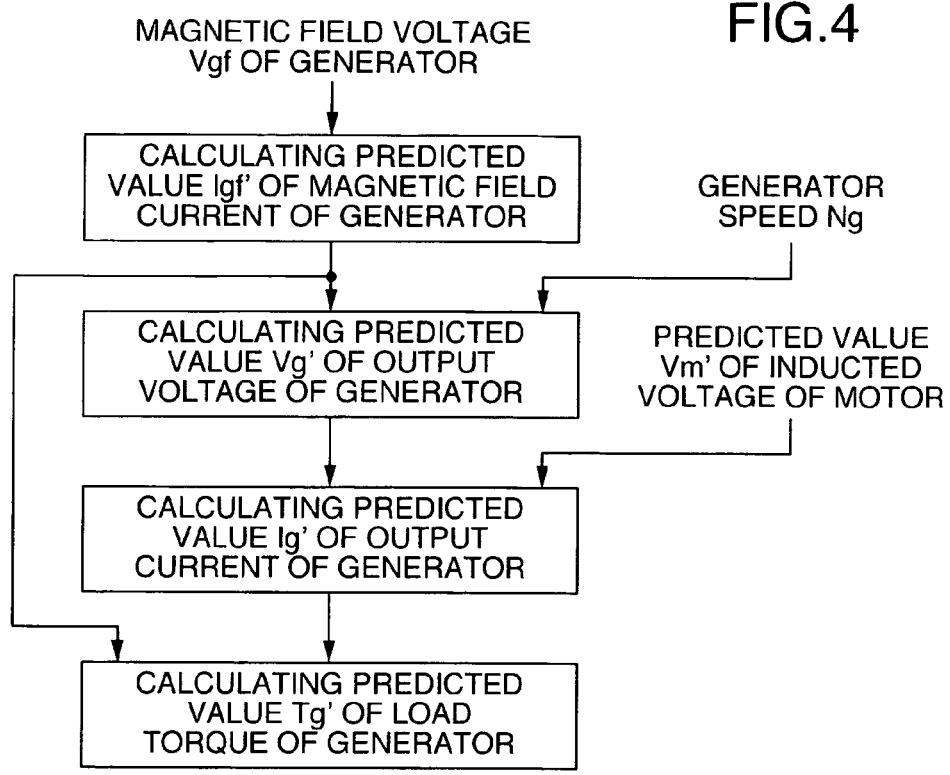
FIG. 4 is a view for explaining, as an example, a specific process at step 13 shown in FIG. 2.

At step 13, the predicted value Tg' of the generator load torque is calculated. Since several hundred milliseconds elapse at maximum until the generator load torque Tg is changed after the magnetic field voltage Vgf of the generator is changed. A generator load torque Tg' after the above-mentioned time elapses is predicted in view of the present field magnetic voltage Vgf of the generator and the like. This process is shown in FIG. 4 as an example thereof.

At first, a predicted value Igf' of magnetic field current of the generator is calculated from the magnetic field voltage Vgf of the generator. The predicted vale Igf' of magnetic field current of the generator may be obtained from Igf'=Vgf/Rgf (where Rgf is an electrical resistance of magnetic circuit of the generator), or may be set to a steady-state value of magnetic field current of the generator which is obtained in reference to a previously prepared table on which the magnetic field voltage Vgf and the steady-state value of magnetic field current of the generator that were obtained by experiments or the like are set. Further, there may be used the target value Igf* of magnetic field current of the generator, instead of the predicted value Igf' of magnetic field current of the generator.

Next, the predicted value Vg' of output voltage of the generator is calculated from the predicted value Igf' of magnetic field current of the generator and a speed Ng of the generator. The predicted value Vg' of output voltage of the generator is obtained in reference to a table on which a relationship among the field magnetic current Igf of the generator, the speed Ng of the generator and the output voltage Vg of the generator which were obtained by experiments are set. Further, there may be used the target value Vg* of output voltage of the generator, instead of the predicted value Vg' of output voltage of the generator.

Further, the predicted value Ig' of output current of the generator is calculated from the predicted value Vg' of output voltage of the generator and the predicted value Vm' of induced voltage of the motor. The predicted value Ig' of output current of the generator may be obtained from Ig'=(Vg'−Vm')/Rm (where Rm is a total electric resistance of the power feeder and the motor), or may be set to a steady-state value of output current of the generator which is obtained in reference to a table on which a relationship among the output voltage Vg of the generator, the induced voltage Vm of the motor and the steady-stage value of output current of the generator that were obtained by experiments is set. Further, there may be used the target value Ig* of output current of the generator, instead of the predicted value Ig' of output current of the generator.

Figure 5:
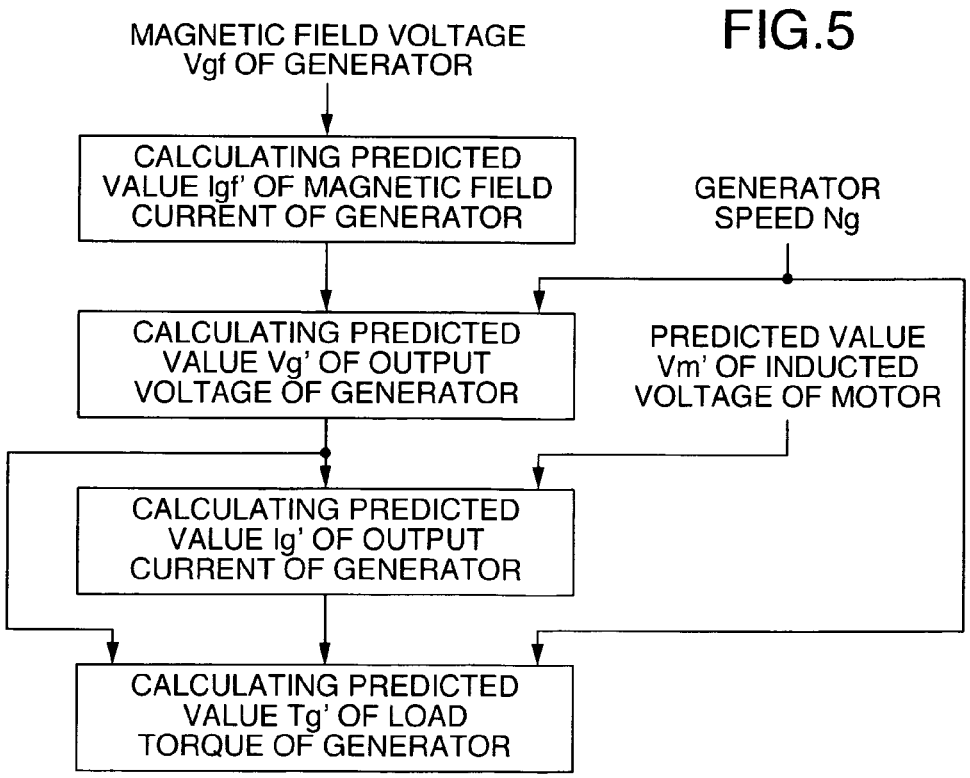
FIG. 5 is a view illustrating, as another example, a specific process at step 13 shown in FIG. 2.

Further, the predicted value Tg' of the generator load torque is calculated from the predicted value Ig' of output current of the generator and the predicted value Igf' of magnetic field current of the generator. Alternatively, as shown in FIG. 5, the predicted value Tg' of load torque of the generator may be calculated from the predicted value Vg' of output voltage of the generator, the predicted value Ig' of output current of the generator and the speed Ng of the generator. Anyway, it is obtained in reference to a table on which the data has been previously set. Further, there may be used the target value Ig* of output current of the generator, instead of the predicted value Ig' of output current of the generator.

Further, the predicted value Tg' of the generator load torque may be determined in reference to a previously prepared table on which the magnetic field voltage Vgf of the generator, the speed Ng of the generator, the predicted value Vm' of induced voltage of the motor and the like are set.

Further, in the above-mentioned calculations, there may be used a signal Ng' which is obtained by advancing the phase of the speed Ng of the generator through a phase advance filter or the like, instead of the speed Ng of the generator.

Further, the predicted value Tg' of the generator load torque may be calculated by advancing the phase of the present generator load torque Tg through a phase advance filter.

Further, the present value Tg of the generator load torque may be measured or estimated, then a deviation between the measured present torque and a previously predicted value is obtained, and thereafter, a value obtained by averaging the deviation over a predetermined time is added as a predicted correction value for the generator load torque to the predicted value Tg' of the generator load torque which has been calculated as stated above.

Figure 6:
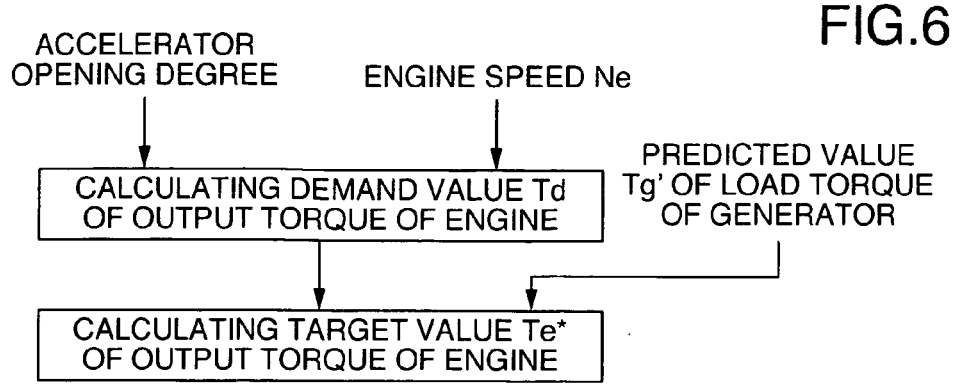
FIG. 6 is a view for explaining, as an example, a specific process at step 14 shown in FIG. 2.

At step 14, a target value Te* of output torque of the engine is calculated in a process an example of which is shown in FIG. 6. At first, a demand value Td of torque of the engine the driver possibly desires to obtain is calculated from the accelerator opening degree TVO and an engine speed Ne. Then, this demand value Td of torque of the engine is added thereto with the predicted value Tg' of the load torque generator calculated at step 13 so as to obtain the target value Te* of torque of the engine.

Further, in the case of a hybrid vehicle as shown in FIG. 1, the demand value Td of torque of the engine may be decreased by a value corresponding to a thrust force for the vehicle produced by the motor 6 in order to reduce the thrust force for the vehicle which is taken off from the transmission 3. However, the lower limit value of the demand value Td of torque of the engine should be set to a value which can prevent the engine from coming to a stop.

Further, if the calculated target value Te* of torque of the engine exceeds a maximum output torque of the engine at the engine speed Ne at that time, the target value Tm' of the motor torque, the target value Ig* of output current of the generator, the target value Vg* of output voltage of the generator, the target value Igf* of magnetic field current of the generator or the magnetic field voltage Vgf of the generator may be decreased. Alternatively, the demand value Td of toque of the engine may be decreased. However, the lower limit value of the demand torque Td of the engine should be set to a value which can prevent the engine from coming to a stop.

Further, a response time te for the output torque Te of the engine and a predictable time tg (a response time for the generator load toque) for the generator load torque Tg are estimated in reference to a table which has been previously prepared with the use of the speed Ne of the engine and the like at that time, and if the predictable time tg for the generator load torque is longer than the response time te for the output torque of the engine, the predicted value Tg' of load toque of the generator may be delayed by (tg−Te). If the predictable time tg for the generator load torque is shorter than the response time te for the output torque of the engine, the phase of the predicted value Tg' of the generator load torque may be advanced by (te−tg) with the use of a phase advance filter or the like in order to make both values equal to each other. Alternatively, the target value Tm* of torque of the motor, or the target value Ig* of output current of the generator, the target value Vg* of output voltage of the generator, the target value Igf* of magnetic field current of the generator or the magnetic field voltage Vgf of the generator may be decreased.

At step 15, the engine is controlled in accordance with the target value Te* of output torque of the engine determined at step 14. The output toque of the engine may be changed by changing the throttle opening degree, the fuel injection value or the ignition timing. In general, the change of the fuel injection value or the ignition timing allows the time required for changing the output torque of the engine to be shorter that that obtained by the change of the throttle opening degree. However, the fuel injection value and the ignition timing have been set in general so as to substantially maximize the output toque of the engine, and accordingly, in this case, there is substantially no room for directly increasing the output torque of the engine as it is. Accordingly, in the case of carrying out such a control that the fuel injection value or the ignition timing is changed in order to increase the output torque of the engine, the fuel injection value or the ignition timing should be beforehand set so as to prevent the output torque of the engine from being relatively large. Alternatively, upon such a prediction that the output torque of the engine should be increased during, for example, a start of a vehicle, the fuel injection value or the ignition timing is shifted so as to make the output torque equal in total, simultaneously with increase of the throttle opening degree.

FIGS. 7 and 8 show, as an example, the generator load torque Tg, the throttle opening degree TVO and the output torque Te of the engine, which vary when the target value Tm* of torque of the motor varies after the vehicle is started in the case of the vehicle having the configuration shown in FIG. 1. FIG. 7 shows such an example that the throttle opening degree TVO is changed on the basis of the present value Tg of the generator load torque with no application of the present invention while FIG. 8 shows such an example, the throttle opening degree TVO is changed on the basis of the predicted value Tg' of load torque of the generator with the application of the present invention.

Referring to FIG. 7, The peaks of the throttle opening degree TVO are delayed from the peaks of the generator torque Tg by the response time of the electronic control throttle. The peaks of the output torque Te of the engine are further delayed from the peaks of the throttle opening degree TVO, and accordingly, are greatly delayed from the peaks of the generator load torque Tg. Thus, the value obtained by subtracting the generator load torque Tg from the engine torque, becomes smaller for a while, and accordingly, the torque the drive-desires can not only be obtained, but also possibly causes occurrence of an engine stall when the engine load becomes larger upon engagement of clutch or the like.

Referring to FIG. 8, the peaks of the throttle opening degree TVO are advanced from the peaks of the generator load toque Tg. Further, the peaks of the engine output torque Te are substantially coincidence with the peaks of the load torque Tg of the generator. Thus, the value obtained by subtracting the generator load torque Tg from the torque of the engine becomes substantially constant.

As stated above, in this embodiment, even though the generator load torque varies, the engine torque the driver desires may be ensured, and in particular, the possibility of the risk of occurrence of an engine stall may be lowered even if the engine load becomes larger upon, for example, engagement of the clutch.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle comprising an internal combustion engine incorporated therein, a plurality of drive mechanisms, a generator having a magnetic field current that is changeable by adjustment of a magnetic field voltage to modify output electric power and generator load torque, said generator driven by the internal combustion engine, and an electric motor for driving vehicle wheels, wherein said drive mechanisms are configured to be controlled based on a field voltage of said generator and rotating speeds of said generator and of said electric motor, and if the load torque of said generator varies, a peak value of wave height with respect to a time axis of a waveform, indicating variation of operation of the drive mechanisms, occurs earlier than a peak value of wave height with respect to a time axis of a waveform, indicating variation of the load torque of the generator.

* * * * *